United States Patent
Giudici et al.

(10) Patent No.: US 9,824,110 B2
(45) Date of Patent: Nov. 21, 2017

(54) METHOD, SYSTEM AND PROGRAM PRODUCT FOR MANAGING DATA REPRESENTATIVE OF THE PERSONAL EXPERIENCE OF A USER ON AN EXERCISE EQUIPMENT

(71) Applicant: Technogym S.p.A., Gambettola, Forli'-Cesena (IT)

(72) Inventors: Fabrizio Giudici, Gambettola (IT); Stefano Santilli, Gambettola (IT); Carlo Pescio, Gambettola (IT)

(73) Assignee: Technogym S.p.A., Gambettola (IT)

( * ) Notice: Subject to any disclaimer, the term of this patent is extended or adjusted under 35 U.S.C. 154(b) by 117 days.

(21) Appl. No.: 13/781,591

(22) Filed: Feb. 28, 2013

(65) Prior Publication Data
US 2014/0244575 A1    Aug. 28, 2014

(51) Int. Cl.
G06F 7/00 (2006.01)
G06F 17/00 (2006.01)
G06F 17/30 (2006.01)

(52) U.S. Cl.
CPC ............... *G06F 17/30345* (2013.01)

(58) Field of Classification Search
USPC .......................................................... 707/609
See application file for complete search history.

(56) References Cited

U.S. PATENT DOCUMENTS

| | | | |
|---|---|---|---|
| 2005/0233861 A1* | 10/2005 | Hickman et al. | 482/8 |
| 2005/0272564 A1* | 12/2005 | Pyles et al. | 482/54 |
| 2006/0058156 A1* | 3/2006 | Cohen et al. | 482/4 |
| 2012/0264568 A1* | 10/2012 | Allowitz-Thompson | G06F 19/3481 482/4 |

* cited by examiner

*Primary Examiner* — Muluemebet Gurmu
(74) *Attorney, Agent, or Firm* — Blank Rome LLP

(57) ABSTRACT

Method, system and program product for managing data representative of the personal experience of a user on an exercise equipment. During the execution of a client software application launched by the user of the exercise equipment, when the client software application sends a request of updating data representative of the state of the client software application to a database remotely disposed with respect to the exercise equipment, updated data representative of the state of the client software application are retrieved, associated to a user identification code and temporarily stored in a first memory unit of the exercise equipment. When a procedure of logout of the user on the exercise equipment is performed, the updated data representative of the state of the client software application associated with said user identification code are stored in a second memory unit of the exercise equipment and sent to the remote database.

12 Claims, 2 Drawing Sheets

METHOD, SYSTEM AND PROGRAM PRODUCT FOR MANAGING DATA REPRESENTATIVE OF THE PERSONAL EXPERIENCE OF A USER ON AN EXERCISE EQUIPMENT

FIELD OF THE DISCLOSURE

The present disclosure relates to the fitness industry, particularly, to a method, system and product program for managing data representative of the personal experience of a user on an exercise equipment.

BACKGROUND

It should be noted that data representative of the personal experience of a user on an exercise equipment means data that a user builds (i.e. creates and/or updates) during the use of a client software application (of a standard type, commercially available on the market), i.e. data representative of the state of the client software application, accessible through the console (i.e. a graphical user interface or desktop) of an exercise equipment.

Examples of such data include configuration parameters of a client software application (e.g., preferences, graphical layout, archive data of the client software application), login/password to access to website through a client software application, if any (e.g. e-mail website, social network website), game level/score achieved in a client software application of a game (e.g., "Angry birds", "Ruzzle"), multimedia content (video and/or audio) and interruption time instant of the enjoyment of a multimedia content through a client software application of multimedia content, and so on.

When a user uses an exercise equipment, data representative of the personal experience built by the user on the exercise equipment can be recovered by a subsequent user using the same exercise equipment. In other words, it can be disadvantageously shared by all the users using the same exercise equipment until the exercise machine is put under the condition "stand-by" or is turned off.

In addition, when a user leaves the exercise equipment and the exercise equipment is in the condition of "stand-by" or is turned off, the personal experience built by the user on the exercise equipment (i.e. the state of one or more client software application the user used on the exercise equipment) is lost and in the case of a subsequent use of an exercise equipment (the same exercise equipment or another one), launching a client software application, the user have to start from the beginning, i.e., for example, proceeding with a new login, a new match on a video game, a new use of a media content, and so on.

In light of the above, nowadays, the availability of a personal experience built by a user on all the exercise equipment that a user could employ, is needed.

In other words, making available the personal experience built by user with a client software application on a first exercise equipment (i.e. the state of the client software application on the first exercise equipment) also on a second exercise machine, or making available the personal experience built on the first exercise machine so that it can be continued and updated, launching the same client software application, even on the second exercise machine, is needed.

Furthermore, nowadays, a user would like its personal experience previously built on an exercise equipment (i.e. state of one or more client software application) could be retrieved, in a subsequent time, during the use of the same exercise equipment.

Therefore, making available the personal experience that a user built on an exercise equipment in a first time also at a later time, when the user uses the same exercise equipment, or making available the personal experience built by each user on an exercise equipment whenever the same user reuses the same exercise equipment is strongly needed.

SUMMARY OF THE INVENTION

According to some aspects of the present description, a method for managing data representative of the personal experience of a user on an exercise equipment is provided with allows to overcome the drawbacks above mentioned with reference to the prior art and in particular that it is able to keep available the personal experience created, updated and stored by a user on the exercise equipment also at a subsequent time following its creation or update, both on the same exercise equipment or on another exercise equipment, also remotely.

According to a first aspect, there is provided a method for managing data representative of the personal experience of a user on an exercise equipment, comprising:
  during the execution of a client software application launched by the user of the exercise equipment, when the client software application send a request of updating data representative of the state of the client software application to a database remotely disposed with respect to the exercise equipment, retrieving, by means of a software module executed by a data processing unit of the exercise equipment, updated data representative of the state of the client software application corresponding to said request of updating data;
  temporarily storing in a first memory unit of the exercise equipment, by means of the software module, said updated data representative of the state of the client software application, associating them to a user identification code;
  storing, by means of the software module, when a procedure of logout of the user on the exercise equipment is performed, the updated data representative of the state of the client software application associated with said user identification code in a second memory unit of the exercise equipment;
  sending, by means of the software module, such updated data representative of the state of the client software application associated with the user identification code from the second memory unit to the remote database.

According to a second aspect, there is provided a system for managing data representative of a personal experience of a user on an exercise equipment, comprising: an exercise equipment having a data processing unit and a first memory unit operatively associated to the data processing unit, said first memory unit being configured to store a software module executable by the data processing unit, said exercise equipment further comprising a second memory unit operatively connected to said data processing unit; a database remotely disposed with respect to exercise equipment. The exercise equipment, by means of the software module, is configured to:
  during the execution of a client software application launched by the user of the exercise equipment, when the client software application send a request of updating data representative of the state of the client software application to the remote database, retrieve updated data representative of the state of the client software application corresponding to said request of updating data;

temporarily store in the first memory unit said updated data representative of the state of the client software application, associating them to a user identification code;

store, when a procedure of logout of the user on the exercise equipment is performed, the updated data representative of the state of the client software application associated with said user identification code in the second memory unit;

send such updated data representative of the state of the client software application associated with the user identification code from the second memory unit to the database.

According to a third aspect, it is provided a program product loadable in a memory unit of an electronic calculator (e.g. an exercise equipment), the program product being executed by a data processing unit of the electronic calculator to perform:

during the execution of a client software application launched by the user of an exercise equipment, when the client software application send a request of updating data representative of the state of the client software application to a database remotely disposed with respect to the exercise equipment, retrieving updated data representative of the state of the client software application corresponding to said request of updating data;

temporarily storing in a first memory unit of the exercise equipment said updated data representative of the state of the client software application, associating them to a user identification code;

storing, by means of the software module, when the user leaves the exercise equipment, the updated data representative of the state of the client software application associated with said user identification code in a second memory unit of the exercise equipment;

sending such updated data representative of the state of the client software application associated with the user identification code from the second memory unit to the remote database.

Further aspects are provided in the description, drawings and claims of the present application.

BRIEF DESCRIPTION OF THE DRAWINGS

Further features and advantages of the method, the system and the product program according to the present disclosure will appear more clearly from the following description of preferred embodiments thereof, given by way of a non-limiting example with reference to the annexed figures, wherein.

DETAILED DESCRIPTION OF THE PREFERRED EMBODIMENTS

With reference to the embodiment of FIG. 1, a system 100 for managing data representative of a personal experience of a user on an exercise equipment, hereinafter also referred to simply as system 100, is now described.

The system 100 comprises a exercise equipment 1.

It should be noted that, according to the present disclosure, exercise equipment means any equipment, machine or apparatus which can be used by a user for executing training or exercise program, having electronic on board, particularly user interface for controlling the exercise equipment and enjoying client software application, as it will be clearly explained in the following. Examples of such exercise equipment can be a cardio training machine like a treadmill, a bike, a spinning machine, and so on, or a strength training machine like a chest press, a shoulder press, a leg press and so on.

Figure 1:
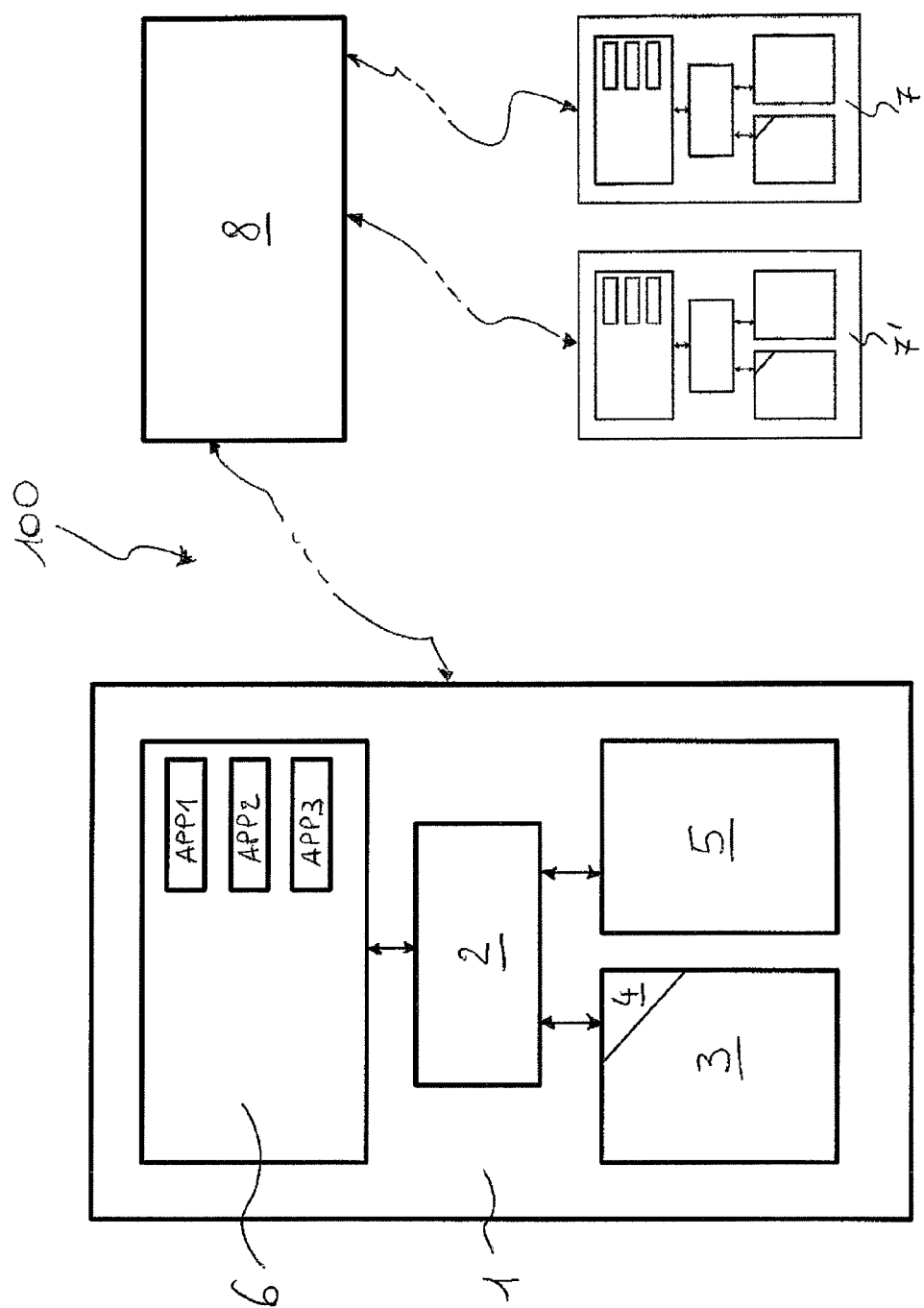
FIG. 1 shows a schematic view of a system for managing data representative of the personal experience of a user on an exercise equipment according to an embodiment of the disclosure.

It should be observed that in the embodiment of the FIG. 1 the equipment machine is represented as a block diagram only, in order to better highlight the technical features of the exercise equipment which are important for the present disclosure. The exercise equipment of FIG. 1 can be a treadmill.

In addition, it is confirmed that "data representative of the personal experience of a user on an exercise equipment" means data that a user builds (i.e. creates and/or updates) during the use of a client software application (of a standard type, commercially available on the market), i.e. data representative of the state of a client software application, accessible through a control panel (i.e. a graphical user interface or desktop) of the exercise equipment 1.

Examples of such data are configuration parameters of a client software application (e.g., preferences, graphical layout, archive data), credential (e.g. login/password) to access to website through a client software application (e.g. e-mail website, social network website), game level/score achieved in a client software application of a game (e.g., "Angry birds", "Ruzzle"), entertainment multimedia content (video and/or audio and/or any other entertainment content) and interruption time instant of the enjoyment of the entertainment multimedia content, and so on.

Furthermore, it is also confirmed that "client software application" means client software application of the standard type available on the market for electronic calculator and/or portable electronic device such as a personal computer, a notebook, a mobile phone (e.g. a smartphone), a tablet, a digital audio/video file reader (e.g. a MP3 reader), and so on.

With reference again to the embodiment of FIG. 1, the exercise equipment 1 comprises a data processing unit 2, e.g. a microprocessor or a microcontroller, and a first memory unit 3, operatively associated to the data processing unit 2. The first unit memory 3 is configured to store both a product program (e.g. program code) to allow the exercise equipment 1 to manage the training of a user and the data processed by the data processing unit 2 during the operation of the exercise equipment 1.

In addition, the first memory unit 3 is configured to store one or more client software application to allow the user to enjoy website, entertainment media content and in general digital services provided by said one or more client software application directly through the exercise equipment 1.

Furthermore, the first memory unit 3 is configured to store data processed by the data processing unit 2 during the user enjoys said one or more client software application, e.g. data representative of the state of said one or more client software application.

Again, as it will be detailed later, the first memory unit 3 is also configured to store a software module (e.g. a product program, indicated as reference number 4 in FIG. 1) to allow the data processing unit 2 (of the exercise equipment 1) to manage data representative of a personal experience of a user on the exercise equipment 1, i.e. data representative of the state of a client software application enjoyed by the user during the use of the exercise equipment 1.

Turning to the embodiment of FIG. 1, the exercise equipment 1 further comprises a second memory unit 5, for example a FLASH memory, operatively associated to the data processing unit 2.

The second memory unit 5, as it will be also described later, is configured to provisionally store data representative of the personal experience of the user on the exercise equipment 1, i.e. data representative of the state of a client software application.

It should be noted that the data to be stored in the second memory unit 5 are provided by the data processing unit 2, by means of the software module 4.

The exercise equipment 1 also comprises a control panel 6, for example a display with a graphical user interface of the touch-screen type, operatively associated with the data processing unit 2.

The control panel 6 is configured to allow the user to send command to the data processing unit 2 to set up and use the exercise equipment 1.

In addition, the control panel 6 is configured to allow the user to enjoy one or more client software application, as described above. In this regard, in FIG. 1, the control panel 6 includes three icons symbolically reported as representative of three client software applications, named as APP1, APP2 and APP3, which can be enjoy by an user.

As previously mentioned, the data representative of the state of a client software application used by a user allow to generate the data representative of personal experience built by the user on the exercise equipment 1.

The system 100 of the embodiment of FIG. 1 can comprise at least one or more further exercise equipment analogous to the exercise equipment 1, previously described.

In the embodiment of FIG. 1, two further exercise equipment, indicated with the reference number 7 and 7', respectively, are reported, each of them illustrated with the same block diagram used for the exercise equipment 1.

Turning back to the embodiment of FIG. 1, the system 100 further comprises a database 8, e.g. a database of a server computer, remotely disposed with respect to the exercise equipment 1 and said one or more further exercise equipment 7 and 7', if present. In the following, the database 8 will be named as remote database 8. The server computer comprising the database is configured, by means of a dedicated program product, to receive request of updating data representative of the state of a client software application enjoyed by a user on the exercise equipment and to store, in the remote database 8, updated data representative of the state of a client software application enjoyed by a user on the exercise equipment.

In a greater detail, the remote database 8 is operatively connected to the exercise equipment 1 and said one or more further exercise equipment 7, if present. As an example, the remote database 8 is operatively connected to the exercise equipment 1 and said one or more further equipment 7 and 7', if present, by means of a communication network, e.g. a wired communication network or a wireless communication network, for example Internet.

For the understanding of the present disclosure, it should be considered that when a client software application of a standard type (as APP1, APP2 or APP3) is executed by a user on the exercise equipment 1, the data processing unit 2 of the exercise equipment 1, any time the client software application send to the remote database 8 a request of updating data (to be stored in the first memory unit 3) representative of the state of the client software application, updates data in the first memory unit 3. The updating of such data in the first memory unit 3 represents the updating of the personal experience built by the user on the exercise equipment 1.

In view of this, the Applicant understood the possibility to acquire and store in a further memory (i.e. the second memory unit 5), any time a request of updating data representative of the state of the client software application is retrieved, data representative of the state of the client software application. In this way, the further memory can be written with updated data representative of the state of a client software application launched by a user on a first exercise equipment (as the exercise equipment 1).

On the other hand, the further memory can be read in order to retrieve and upload data representative of the state of a client software application on a second exercise equipment (as the further exercise equipment 7 or 7') or on the first exercise equipment (as the exercise equipment 1) if use in a later time by the same user.

On the basis of these assumptions, the description of the embodiment of FIG. 1 of the present disclosure continues as follows.

The exercise equipment 1, by means of the software module 4 stored in the first memory unit 3 and executable by the data processing unit 2, is configured to perform the following operations related to the management of data representative of the personal experience of a user of an exercise equipment 1.

During the execution of client software application (for example the first software application APP1) launched by the user of the exercise equipment 1, when the client software application send to the remote database 8 a request of updating data (to be stored in the first memory unit 3) representative of the state of the client software application, is configured to retrieve updated data representative of the state of the client software application corresponding to said request of updating data.

In order to do so, the exercise equipment 1, by means of the software module 4, is configured to retrieve a request of updating data representative of the state of the client software application in the first memory unit 3, sent by the client software application to the remote database 8.

In addition, the exercise equipment 1, by means of the software module 4, is configured to temporarily store in the first memory unit 3 said updated data representative of the state of the client software application, associating them to a user identification code.

Again, the exercise equipment 1, by means of the software module 4, is also configured, when the user leaves the exercise equipment 1, to store the updated data representative of the state of the client software application associated with said user identification code in the second memory unit 5, previously described.

In order to do so, the exercise equipment 1, by means of the software module 4, is also configured to recognize when a procedure of logout of the user on the exercise equipment 1 is performed.

It should be observed that the procedure of logout on the exercise equipment 1 can be explicitly performed by the user himself, as well as the procedure of login, by pushing a "logout" button on the control panel 6 of the exercise equipment 1. Alternatively, the procedure of logout can be implicitly performed by the exercise equipment 1 which recognizes when the operation of the exercise equipment ends, e.g. when a treadmill ends to move.

Furthermore, the exercise equipment 1, be means of the software module 4, is also configured to send such updated data representative of the state of the client application software associated with the user identification code from the second memory unit 5 to the remote database 8, previously described.

A further exercise equipment, e.g. one of the two further equipment 7 and 7' illustrated in FIG. 1, distinct with respect to the exercise equipment 1, by means of a software module stored in its first memory unit and executable by its data processing unit, as well as in the exercise equipment 1, is also configured, when a user launches and executes a client software application (e.g. APP1) on the further exercise equipment (7 or 7') and the client software application send to the remote database 8 a request of updating data (to be stored in the first memory unit 3) representative of the state of the client software application, on the basis of the user identification code, to retrieve from the remote database 8 updated data representative of the state of the client software application associated to the user identification code, corresponding to said request of updating data.

In view of this, the updated data representative of the state of a client software application (personal experience built by the user) on the exercise equipment 1 at a first time can be retrieve on a further exercise equipment (7 or 7') at a second time, subsequent said first time, in a manner transparent to the user.

In a corresponding way, when the user launches and executes a client software application on the exercise equipment 1, in a second time, also the exercise equipment 1 is also configured, by means of the software module 4, when the client software application send to the remote database 8 a request of updating data (to be stored in the first memory unit 3) representative of the state of the client software application, on the basis of the user identification code, to retrieve from the database 8 updated data representative of the state of the client software application associated to the user identification code, corresponding to said request of updating data.

Also in this case, the updated data representative of the state of a client software application (personal experience built by the user) on the exercise equipment 1 at a first time can be retrieve on the same exercise equipment 1 at a second time, subsequent said first time, in a manner transparent to the user.

It should be also noted that in the case it was not possible to transfer data from an exercise equipment to the remote database 8 (due to a network problem or a failure/fault into the exercise equipment or into the remote database 8), the data to be transferred remain as stored into the first unit memory 3 of the exercise equipment 1.

In the event the user is approaching the exercise equipment 1 but in the meantime he has updated the data representative of the state of the client application software (personal experience) on another exercise equipment (for example the further exercise equipment 7 or 7'), the exercise equipment 1, by means of the software module 4, is configured to compare the date of storage of the updated data received from the remote database 8 (data relating to the updated data representative of the state of the client software application on the further exercise equipment 7 or 7') and those updated data stored on the exercise machine 1. On the basis of this comparison, the exercise equipment 1 is configured to consider as valid the updated data having the most recent date.

In a corresponding way and in the same condition, also the further exercise equipment (7 or 7') is configured to compare the dates of storage and to consider as valid the updated data having the most recent date.

Figure 2:
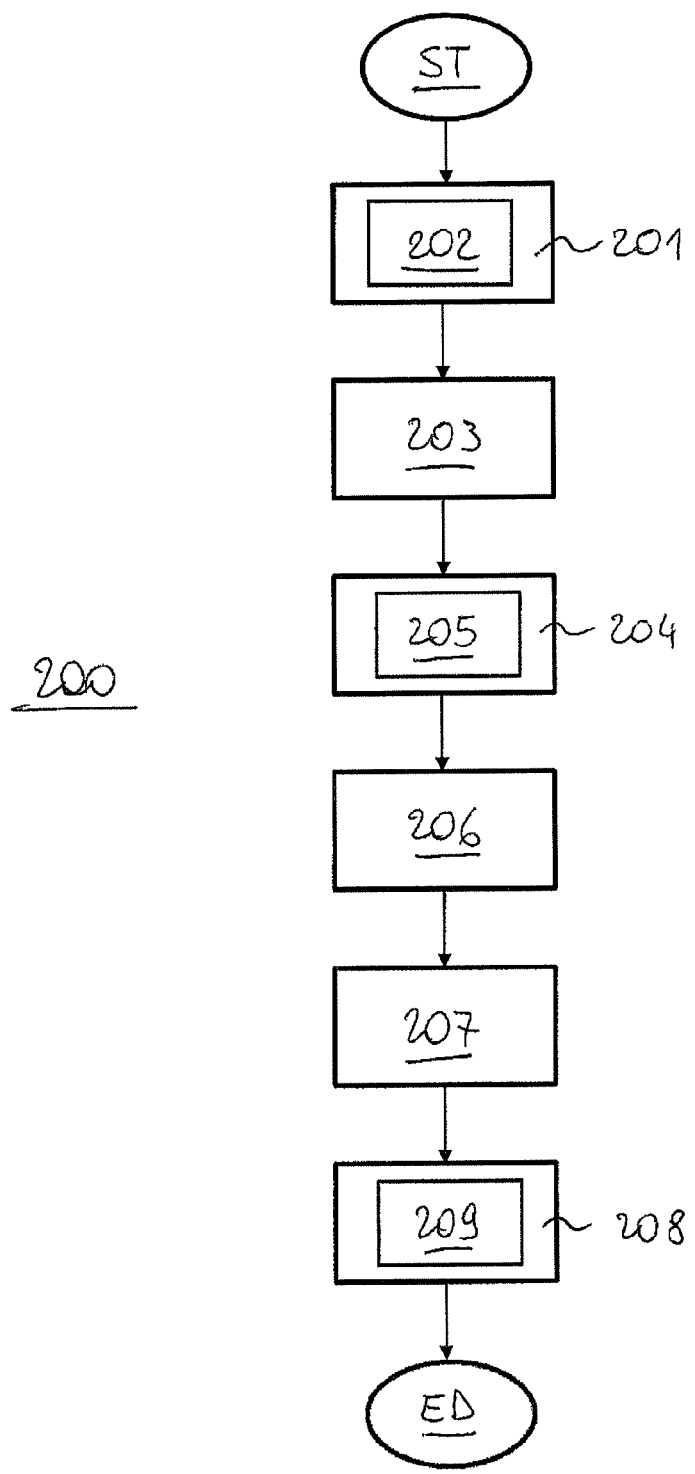
FIG. 2 shows a block diagram of a method for managing data representative of the personal experience of a user on an exercise equipment according to an embodiment of the disclosure.

With reference again to FIG. 1 and in particular to the block diagram of FIG. 2, a method for managing data representative of the personal experience of a user on an exercise equipment according to a further embodiment of the present disclosure is now described.

The method 200 for managing data representative of the personal experience of a user on an exercise equipment 1, in the following simply method 200, comprises a symbolic step of start ST.

During the execution of client software application (for example the first software application APP1) launched by the user of the exercise equipment 1, when the client software application send to the remote database 8 a request of updating data (to be stored in the first memory unit 3) representative of the state of the client software application, the method 200 comprises the step of retrieving 201, by means of a software module 4 executed by the data processing unit 2 of exercise equipment, updated data representative of the state of the client software application corresponding to said request of updating data.

In order to do so, the step of retrieving 201 updated data representative of the state of the client software application corresponding to said request of updating data comprises a step of retrieving 202, by means of the software module 4, a request of updating data representative of the state of the client software application in the first memory unit 3 of the exercise equipment 1, sent by the client software application during its execution to the remote database 8.

In addition, the method 200 further comprises the step of temporarily storing 203 in the first memory unit 3, by means of the software module 4, said updated data representative of the state of the client software application, associating them to a user identification code.

Again, the method 200 further comprises the step of storing 204, by means of the software module 4, when the user leaves the exercise equipment 1, the updated data representative of the state of the client software application associated with said user identification code in the second memory unit 5 of the exercise equipment 1.

In order to do so, the step of storing 204 the updated data representative of the state of the client software application associated with said user identification code in the second memory unit 5 of the exercise equipment 1 further comprises the step of recognizing 205, by means of the software module 4, when a procedure of logout of the user on the exercise equipment 1 is performed.

As previously described, it should be noted that the procedure of logout can be explicitly performed by the user himself, as well as the procedure of login, by pushing a "logout" button on the control panel 6 of the exercise equipment 1. Alternatively, the procedure of logout can be implicitly performed by the exercise equipment 1 which recognizes when the operation of the exercise equipment ends, e.g. when a treadmill ends to move.

Furthermore, the method 200 further comprises the step of sending 206, be means of the software module 4, such updated data representative of the state of the client software application associated with the user identification code from the second memory unit 5 to the remote database 8, previously described.

Furthermore, the method 200 comprises the step of retrieving 207 from the remote database 8, by means of the software module 4, when the same user launches and executes a client software application (e.g. APP1) on a further exercise equipment and the client software application send to the remote database 8 a request of updating data (to be stored in the first memory unit 3) representative of the state of the client software application, on the basis of the user identification code of the user, updated data representative of the state of the client software application associated to the user identification code, corresponding to said request of updating data.

It should be noted that such a further exercise equipment could be one of said one or more further exercise equipment 7 and 7' or the same exercise equipment 1, as already previously described.

In view of this, with the method 200 of the present disclosure, the updated data representative of the state of a client software application (personal experience built by the user) on the exercise equipment 1 at a first time can be retrieve on a further exercise equipment (7 or 7'), or on the same exercise equipment1, at a second time, subsequent to said first time, in a manner transparent to the user.

It should be also noted that in the case it was not possible to transfer data from an exercise equipment to the remote database 8 (due to a network problem or a failure/fault into the exercise equipment or into the database 8), the data to be transferred remain as stored into the first unit memory 3 of the exercise equipment 1.

In the event the user is approaching the exercise equipment 1 but in the meantime he has updated the data representative of the state of the client application software (personal experience) on a further exercise equipment, the method 200 further comprises the step of comparing 208, by means of the software module 4 executed by the data processing unit 2 of such further exercise equipment, the date of storage of the updated data representative of the state of the client software application received from the database 8 and the updated data representative of the state of the same client software application stored on the exercise machine 1.

Furthermore, the method 200 comprises the step of consider 209 as valid, by means of the software module 4 executed by the data processing unit 2 of such further exercise equipment, on the basis of the result of said step of comparing 208, the updated data having the most recent date of storage.

It should be observed that such further exercise equipment could be one of said one or more further exercise equipment 7 and 7' or the same exercise equipment 1, as already previously described.

The method 200 ends with a symbolic step of end ED.

According to a further embodiment of the present disclosure, a program product can be loaded in the first memory unit 3 of an electronic calculator (e.g. the exercise equipment 1, or the further exercise equipment 7 or 7', provided with the data processing unit 2). The program product can be executed by the data processing unit of the electronic calculator (e.g. the data processing unit 2 of the exercise equipment 1 or of said at least one or more further exercise equipment 7 or 7') to perform the steps of the method 200 for managing data representative of the personal experience of a user on the exercise equipment, previously described with reference to the embodiment of FIG. 2.

The method, the system and the product program according to the embodiments of the present disclosure allows the user to retrieve its personal experience built on an exercise equipment used in a first time also on another exercise equipment used in a second time, subsequent the first time.

In addition, the method of the present disclosure, as well as the system and the product program, allows to retrieve the personal experience of a user in a manner which advantageously results transparent to the user himself.

Furthermore, according to the present disclosure, uploading a software module (i.e. the software module 4) on the first memory unit on an exercise equipment allows to easily implement the method of the disclosure, also in the case several exercise equipment are arranged remotely one another, e.g. some exercise equipment are disposed in a club, other exercise equipment are disposed in another club, some equipment are disposed in the home of the user.

Therefore, a user beginning the training at home on an exercise equipment can approach another exercise equipment, e.g. disposed in a club, without lose the personal experience built using the exercise equipment at home.

Again, the method of the present disclosure, thanks to the storing of the data representative the state of a client software application in the database 8, allows the user to retrieve such data built on a first exercise equipment in a first time also in a second exercise equipment at a second time also in the case the time period between the first time and the second time is long, i.e. also some days/weeks/months.

Last but not least, the method, the system and the program product of the present disclosure advantageously allows the exercise equipment to the equipped with client software application of the standard type, i.e. available on the market, according to the definition previously described. In other words, no specific client software applications (i.e. "ad hoc" client software applications) have to be studied, prepared and stored in an exercise equipment in order to implement the method of the present disclosure.

A man skilled in the art may make several changes, adjustments and replacements of elements with other functionality equivalent ones to the embodiments of the method, system and product program for managing data representative of the personal experience of a user on an exercise equipment described above in order to meet incidental needs, without departing from the scope of the following claims. Each of the features described as belonging to a possible embodiment can be obtained independently of the other embodiments described.

The invention claimed is:

1. A method for managing data that a user creates or updates during the use of a client software application on an exercise equipment, comprising:
    during the execution of the client software application launched by the user of the exercise equipment, the client software application being of a standard type available on the market for a portable electronic device, the client software application being at least one of: e-mail, social network, game, and entertainment multimedia content unrelated to the exercise equipment or the use of the exercise equipment by the user, when the client software application sends a request of updating data representative of the state of the client software application to a database remotely disposed with respect to the exercise equipment, retrieving, by means of a software module executed by a data processing unit of the exercise equipment, updated data representative of the state of the client software application corresponding to said request of updating data;
    temporarily storing in a first memory unit of the exercise equipment, by means of the software module, said updated data representative of the state of the client software application, associating them to a user identification code;
    recognizing, by means of the data processing unit executing the software module, when a procedure of logout of the user on the exercise equipment is performed, and then storing, by means of the data processing unit executing the software module, the updated data representative of the state of the client software application associated with said user identification code in a second memory unit of the exercise equipment;

sending, by means of the software module, such updated data representative of the state of the client software application associated with the user identification code from the second memory unit to the remote database;

retrieving from the remote database, when the user launches and executes the client software application on a further exercise equipment and the client software application sends a request of updating data representative of the state of the client software application to the remote database, on the basis of the user identification code, updated data representative of the state of the client software application associated to the user identification code, corresponding to said request of updating data;

comparing, by means of the software module, the date of storage of the updated data representative of the state of a client software application received from the database and the updated data representative of the state of the same client software application stored in the first memory unit of the exercise equipment; and considering as valid, by means of the software module, on the basis of the result of said step of comparing, the updated data having the most recent date of storage; wherein the data representative of the state of the client software application comprises data from a previous use of the client software application by the user.

2. The method of claim 1, wherein said further exercise equipment is the same exercise equipment.

3. The method of claim 1, wherein the step of retrieving updated data representative of the state of the client software application corresponding to said request of updating data comprise the step of retrieving, by means of the software module, a request of updating data representative of the state of the client software application in the first memory unit of the exercise equipment.

4. A system for managing data that a user on an exercise equipment creates or updates during the use of a client software application, comprising:

an exercise equipment having a data processing unit and a first memory unit operatively associated to the data processing unit, said first memory unit being configured to store a software module executable by the data processing unit, said exercise equipment further comprising a second memory unit operatively connected to said data processing unit;

a database remotely disposed with respect to exercise equipment; the exercise equipment, by means of the data processing unit executing the software module, being configured to:

during the execution of a client software application launched by the user of the exercise equipment, the client software application being of a standard type available on the market for a portable electronic device, the client software application being at least one of: e-mail, social network, game, and entertainment multimedia content unrelated to the exercise equipment or the use of the exercise equipment by the user, when the client software application sends a request of updating data representative of the state of the client software application to the remote database, retrieve updated data representative of the state of the client software application corresponding to said request of updating data;

temporarily store in the first memory unit said updated data representative of the state of the client software application, associating them to a user identification code;

recognize when a procedure of logout of the user on the exercise equipment is performed, and then store the updated data representative of the state of the client software application associated with said user identification code in the second memory unit;

send such updated data representative of the state of the client software application associated with the user identification code from the second memory unit to the database; and at least one further exercise equipment analogous to said exercise equipment, said at least one further exercise equipment, by means of the software module, is further configured to:

retrieve from the database, when the user launches and executes the client software application on said at least one or more further exercise equipment and the client software application sends a request of updating data representative of the state of the client software application to the remote database, on the basis of the user identification code, updated data representative of the state of the client software application associated to the user identification code, corresponding to said request of updating data;

wherein the exercise equipment, by means of said the software module, is further configured to:

compare the date of storage of the updated data representative of the state of a client software application received from the database and the updated data representative of the state of the same client software application stored in the first memory unit of the exercise equipment;

consider as valid, on the basis of the result of the comparison, the updated data having the most recent date of storage; and wherein the data representative of the state of the client software application comprises data from a previous use of the client software application by the user.

5. The system of claim 4, wherein said at least one or more further exercise equipment is the same exercise equipment.

6. The system of claim 4, wherein said at least one or more further exercise equipment, by means of said the software module, is further configured to:

compare the date of storage of the updated data representative of the state of a client software application received from the database and the updated data representative of the state of the same client software application stored in the first memory unit of said at least one or more further exercise equipment;

consider as valid, on the basis of the result of the comparison, the updated data having the most recent date of storage.

7. The system of claim 4, wherein the exercise equipment, by means of the software module, is further configure to:

retrieve a request of updating data representative of the state of the client software application in the first memory unit of the exercise equipment.

8. The system of claim 4, wherein the exercise equipment further comprises a control panel of the exercise equipment, operatively associated to the data processing unit of the exercise equipment.

9. A computer program product stored in a memory unit of an electronic calculator, the computer program product being executed by a data processing unit of the electronic calculator to perform:

during the execution of a client software application launched by the user of an exercise equipment, the client software application being of a standard type available on the market for a portable electronic device, the client software application being at least one of: e-mail, social network, game, and entertainment multimedia content unrelated to the exercise equipment or the use of the exercise equipment by the user, when the client software application sends a request of updating data representative of the state of the client software application to a database remotely disposed with respect to the exercise equipment, retrieving updated data representative of the state of the client software application corresponding to said request of updating data;

temporarily storing in a first memory unit of the exercise equipment said updated data representative of the state of the client software application, associating them to a user identification code;

recognizing, by means of the data processing unit executing the software module, when the user leaves the exercise equipment, and then storing the updated data representative of the state of the client software application associated with said user identification code in a second memory unit of the exercise equipment;

sending such updated data representative of the state of the client software application associated with the user identification code from the second memory unit to the remote database;

retrieving from the database, when the user launches and executes the client software application on a further exercise equipment and the client software application sends a request of updating data representative of the state of the client software application to the remote database, on the basis of the user identification code, updated data representative of the state of the client software application associated to the user identification code, corresponding to said request of updating data;

comparing the date of storage of the updated data representative of the state of a client software application received from the database and the updated data representative of the state of the same client software application stored in the first memory unit of the exercise equipment;

consider as valid, on the basis of the result of said step of comparing the updated data having the most recent date of storage;

wherein the data representative of the state of the client software application comprises data from a previous use of the client software application by the user.

10. The computer program product of claim 9, wherein the computer program product is executed by the data processing unit of the electronic calculator to perform, in the step of retrieving updated data representative of the state of the client software application corresponding to said request of updating data, the step of retrieving a request of updating data representative of the state of the client software application in the first memory unit of the exercise equipment.

11. The computer program product of claim 9, wherein the computer program product is executed by the data processing unit of the electronic calculator to perform, in the step of storing the update data representative of the state of the client software application associated with the user identification code in the second memory unit of the exercise equipment, the step of recognizing when a procedure of logout of the user on the exercise equipment is performed.

12. Exercise equipment comprising:
a data processing unit;
a first memory unit operatively associated to the data processing unit, said first memory unit being configured to store a software module executable by the data processing unit;
a second memory unit operatively connected to said data processing unit; the exercise equipment, by means of the data processing unit executing the software module, being configured to:

during the execution of a client software application launched by the user of the exercise equipment, the client software application being of a standard type available on the market for a portable electronic device, the client software application being at least one of: e-mail, social network, game, and entertainment multimedia content unrelated to the exercise equipment or the use of the exercise equipment by the user, when the client software application sends a request of updating data representative of the state of the client software application to the remote database, retrieve updated data representative of the state of the client software application corresponding to said request of updating data;

temporarily store in the first memory unit said updated data representative of the state of the client software application, associating them to a user identification code;

recognize when a procedure of logout of the user on the exercise equipment is performed, and then store the updated data representative of the state of the client software application associated with said user identification code in the second memory unit;

send such updated data representative of the state of the client software application associated with the user identification code from the second memory unit to a database remotely disposed with respect to the exercise equipment;

compare, by means of the software module, the date of storage of the updated data representative of the state of a client software application received from the database and the updated data representative of the state of the same client software application stored in the first memory unit of the exercise equipment; and consider as valid, by means of the software module, on the basis of the result of said step of comparing, the updated data having the most recent date of storage;

wherein the data representative of the state of the client software application comprises data from a previous use of the client software application by the user.

* * * * *